Figure 1:
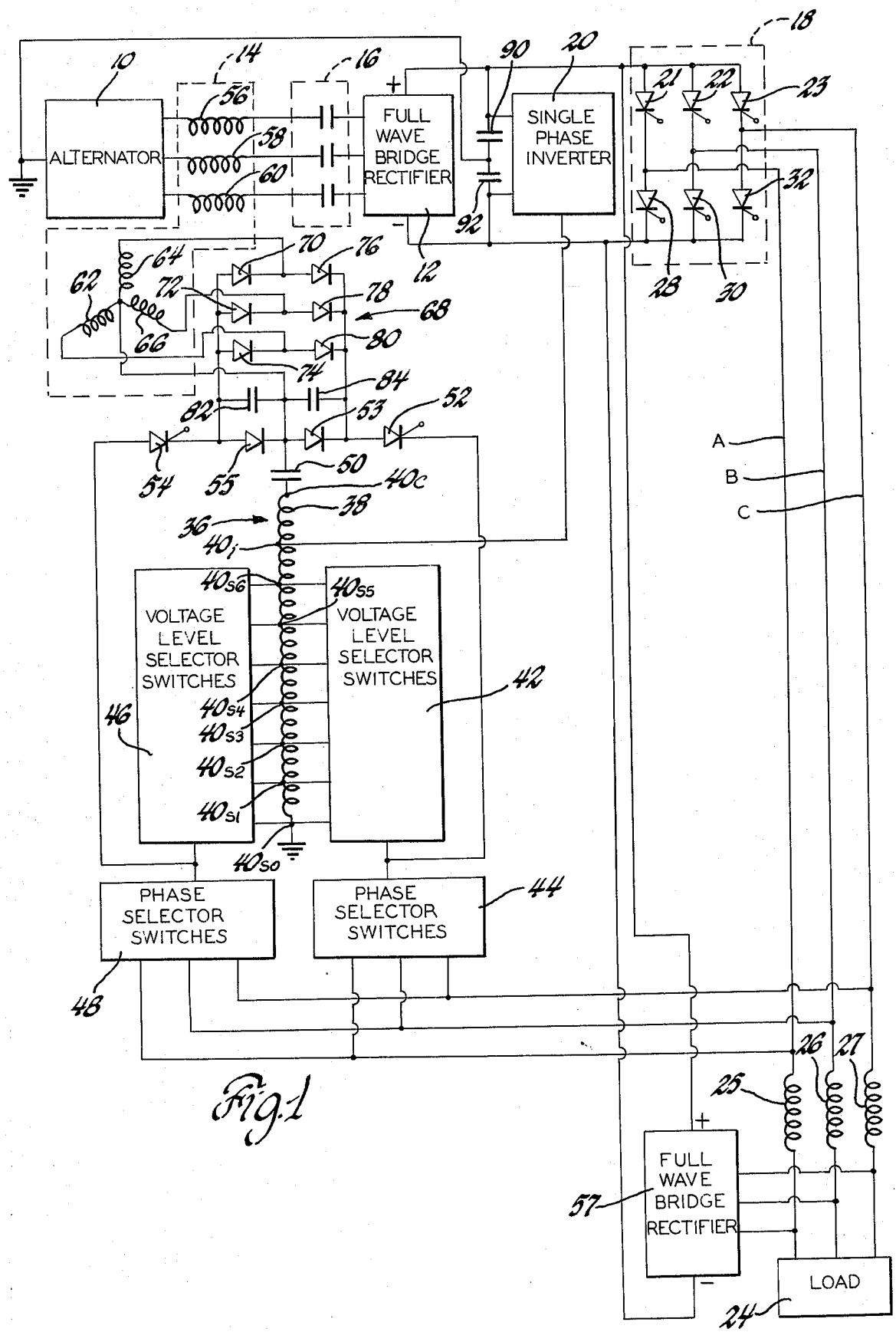

United States Patent [19]
Corry

[11] 3,896,365
[45] July 22, 1975

[54] POWER CENTER INVERTER HAVING POWER CENTER COMMUTATION DURING OPERATION INTO SHORT CIRCUITS

[75] Inventor: Thomas M. Corry, Goleta, Calif.

[73] Assignee: General Motors Corporation, Detroit, Mich.

[22] Filed: Aug. 5, 1974

[21] Appl. No.: 494,630

[52] U.S. Cl. .................. 321/5; 321/9 R; 321/45 C; 321/DIG. 1
[51] Int. Cl. .......................................... H02m 7/52
[58] Field of Search ............ 321/2, 5, 9, 9 A, 27 R, 321/45 C, DIG. 1

[56] References Cited
UNITED STATES PATENTS

| | | | |
|---|---|---|---|
| 3,430,073 | 2/1969 | Leonard | 321/DIG. 1 |
| 3,500,213 | 3/1970 | Ameau | 321/DIG. 1 |
| 3,579,081 | 5/1971 | Bates | 321/DIG. 1 |
| 3,581,212 | 5/1971 | McMurray | 321/DIG. 1 |
| 3,585,488 | 6/1971 | Gutt et al. | 321/9 A |
| 3,603,866 | 9/1971 | Opal | 321/9 A X |
| 3,609,507 | 9/1971 | Beck | 321/9 A X |
| 3,707,668 | 12/1972 | Johnston | 321/5 |
| 3,725,767 | 4/1973 | Corry | 321/9 R X |
| 3,781,635 | 12/1973 | Saver | 321/9 R |
| 3,838,330 | 9/1974 | Rosa | 321/5 |

Primary Examiner—William M. Shoop
Attorney, Agent, or Firm—Howard N. Conkey

[57] ABSTRACT

Apparatus for inverting the rectified output referenced to a point of reference potential of an alternator to generate three-phase, sine-wave, line-to-line output voltages at specified frequencies. A first controlled rectifier inverter receives the rectified DC output of the alternator and produces three-phase, flat-top, full-wave power center voltages on three-phase output conductors and a second inverter operating in synchronism with the first inverter receives the rectified output voltage of the alternator and generates a single-phase, flat-top voltage at three times the frequency of the output of the first inverter. A transformer having a plurality of voltage taps is coupled between the point of reference potential and the second inverter. The voltage taps of the transformer are selectively coupled to the three-phase output conductors so as to produce alternate pairs of stepped ascending and descending voltages which complement the three-phase, flat-top, full-wave voltages to complete the line-to-neutral, three-phase waveforms. These waveforms combine to form three-phase, line-to-neutral voltages. The transformer includes a step-up tap in voltage multiplying position in relation to the flat-top voltage which is selectively coupled to the three-phase output conductors so as to reverse bias and commutate the respective controlled rectifiers in the first inverter. During operation of the apparatus into a short circuit load, a voltage is generated for commutating the controlled rectifiers in the first inverter by a current transformer which is responsive to the current output of the alternator to generate a DC voltage which is selectively coupled to the three-phase output lines to effect commutation of the controlled rectifiers in the first inverter.

2 Claims, 2 Drawing Figures

POWER CENTER INVERTER HAVING POWER CENTER COMMUTATION DURING OPERATION INTO SHORT CIRCUITS

The inverter herein described was made in the course of work under contract or subcontract thereunder with the Department of Defense.

This invention relates to a power center inverter for producing a set of sine-wave, line-to-line voltages from a set of three non-sine, line-to-neutral voltages each having a substantially flat-top power center portion and a plurality of rising and falling voltage steps outboard the flat-top portion and more specifically, to such an inverter including means for providing controlled rectifier commutation during operation into short circuits.

The form of three-phase sinusoidal generator to which this invention is directed is described in my U.S. Pat. No. 3,725,767 which issued on April 3, 1973 the contents of which are hereby incorporated by reference. The generator described therein supplies substantially sine-wave, three-phase, line-to-line output voltages by generating three sets of line-to-neutral voltages displaced by 120° from one another, each comprised substantially of flat-top power center portions combined with stepped ascending and descending voltages. The power center portions are generated by means of a controlled rectifier three-phase inverter and the stepped ascending and descending voltages are generated by means of a transformer having a plurality of voltage taps across which the output of a single-phase, flat-top voltage is applied. These taps are coupled in ascending or descending order and combined with the power center portions to complete the set of three non-sine, line-to-neutral voltages. To provide for commutation of the power center controlled rectifiers, a step-up tap in voltage multiplying relation relative to the output of the single-phase, flat-top voltage is provided which is selectively coupled to the power center controlled rectifiers to effect their commutation.

When this inverter is operating into short circuits, the output of the single-phase, flat-top voltage inverter decreases to or near zero. Consequently, no voltage is available at the step-up tap to commutate the power center controlled rectifiers. It is, therefore, the general object of this invention to provide for the commutation of the power center controlled rectifiers in the aforementioned inverter when said inverter is being supplied by the rectified output of an alternator and is operating into a short circuit load.

It is another object of this invention to provide for a power center inverter having apparatus for generating commutating voltages for commutating the power center controlled rectifiers when the power center inverter is being supplied by the rectified output of an alternator and is operating into a short circuit load.

It is another object of this invention to provide for a power center inverter having apparatus for generating commutating voltages for commutating the power center controlled rectifiers prior to the buildup of short circuit load current when the power center inverter is turned on into a short circuit load.

These and other objects of this invention are accomplished by providing a current transformer sensing the current output of the alternator whose rectified output supplies power to the power center inverter and generating voltages which are rectified to provide a DC commutating voltage. This voltage is used when the inverter is operating into short circuits for commutating the power center controlled rectifiers. To provide for an immediate commutation capability when the power center inverter is turned on into a short circuit load, capacitors are coupled across the rectified output of the alternator. These capacitors present a temporary short circuit to the alternator which supplies a high current output which is sensed by the current sensor to generate a commutating voltage prior to current flowing into the short circuit load upon the charging of the capacitors.

Figure 2:
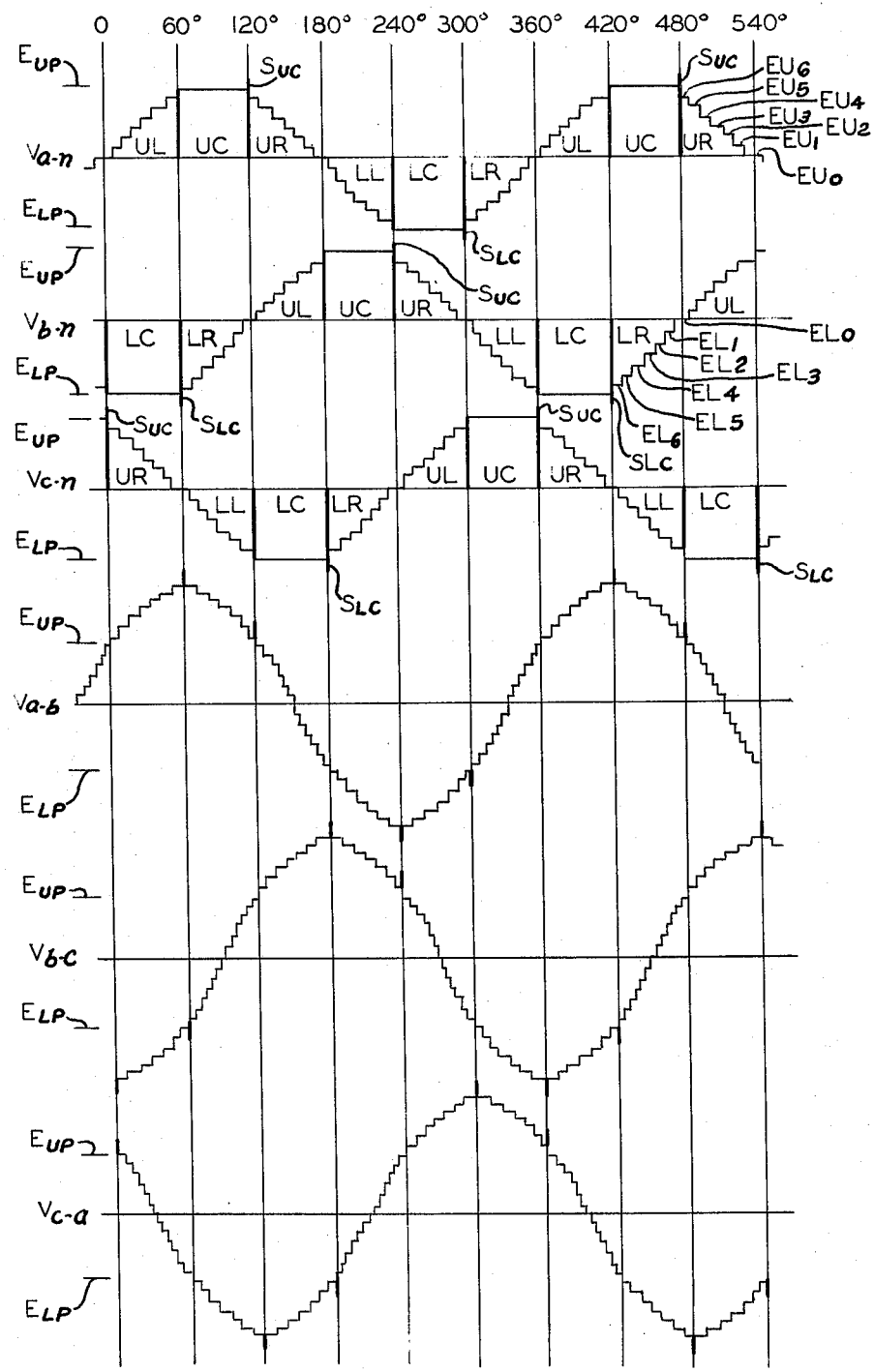

The invention may be best understood by reference to the following description of a preferred embodiment and the drawings in which:

FIG. 1 is a circuit diagram, partially in block form, showing a three-phase power system incorporating the features of the present invention; and FIG. 2 is a diagram showing, in general form, three line-to-neutral and three line-to-line voltages generated by the apparatus of FIG. 1.

Referring to FIG. 1, a three-phase alternator 10 is provided having a three-phase output which is coupled to the inputs of a three-phase, full-wave bridge rectifier 12 poled as shown through a current sensor 14, the purpose of which will be described, and on-off contactors 16. The alternator 10, which is referenced to ground potential, may be a conventional motor driven three-phase AC generator having conventional voltage regulator and current limiter circuits which provide for the generation of a substantially constant alternating voltage output during normal operation and provide for the limitation of output current to, for example, 200% of normal load current during abnormal or short circuit load conditions. The output of the full-wave bridge rectifier 12 is coupled across a three-phase inverter 18 and a single-phase inverter 20.

The three-phase inverter 18 includes controlled rectifiers 21, 22 and 23 which connect the positive output of the full-wave bridge rectifier 12 to respective three-phase lines A, B and C which are coupled to a three-phase load 24 through respective inductors 25, 26 and 27. When one of the controlled rectifiers 21, 22 and 23 is made conductive, the positive output of the full-wave bridge rectifier 12 is applied to the respective line A, B or C. The three-phase inverter 18 further includes controlled rectifiers 28, 30 and 32 which connect the negative output of the full-wave bridge rectifier 12 to the load 24 through the respective three-phase lines A, B and C. When one of the controlled rectifiers 28, 30 and 32 is gated conductive, the negative output of the full-wave bridge rectifier 12 is coupled to the respective line A, B or C. The controlled rectifiers 21, 22, 23, 28, 30 and 32 and the center voltage inverter 18 are selectively gated conductive and commutated so as to generate and apply to the three-phase output lines A, B and C, three-phase, line-to-neutral, flat-top voltages each having a selected duration which may be, for example, 60 electrical degrees. These voltage pulses are illustrated in FIG. 2 as UC (upper center) and LC (lower center) in the respective line-to-neutral voltages $V_{a\text{-}n}$, $V_{b\text{-}n}$ and $V_{c\text{-}n}$.

The single-phase inverter 20 produces single-phase square-wave drive voltage pulses on an output line 34. This drive voltage alternates between an upper potential $E_{l'P}$ and a lower potential $\bar{E}_{LP}$ three times for each cycle of the desired output waveform frequency. Hence, the drive voltage is a square wave which alternately resides at the upper potential $E_{l'P}$ and at the lower potential $E_{LP}$ during successive 60 electrical degree intervals of the line-to-neutral voltages $V_{a-n}$, $V_{b-n}$ and $V_{c-n}$.

A voltage reference device or autotransformer 36 is comprised of a single winding 38 having a multiplicity of voltage taps including an input tap $40_i$, a group of voltage taps $40_{s0}$ through $40_{s6}$ and a commutator tap $40_c$. The input tap $40_i$ is connected with the inverter output line 34. The voltage tap $40_{s0}$ is connected to the ground reference potential. Thus, in operation, the autotransformer 36 is subjected to alternate positive and negative voltages from the single-phase inverter 20 applied through the conductor 34 to the tap $40_i$. This alternating voltage causes the flux linking the winding 38 to alternate at the rate of the applied voltage between the tap $40_i$ and ground. The taps $40_{s0}$, $40_{s1}$, $40_{s2}$, $40_{s3}$, $40_{s4}$, $40_{s5}$ and $40_{s6}$ divide the total applied voltage in accordance with their proportionate turns. These turns are such that each of the taps $40_{s0}$ through $40_{s6}$ is at a respective one of the upper set of stepped levels $E_{U0}$ through $E_{U6}$ in the line-to-neutral waveforms of FIG. 2 when the drive voltage at the input tap $40_i$ is at the upper potential $E_{UP}$ and at a respective one of the lower set of step levels $E_{L0}$ through $E_{L6}$ in the line-to-neutral waveforms of FIG. 2 when the drive voltage at the input tap $40_i$ is at the lower potential $E_{LP}$. The commutator tap $40_c$ which is in voltage multiplying position relative to the drive voltage at the input tap $40_i$ defines an upper commutator level $E_{UC}$ when the drive voltage at the input tap $40_i$ is at the upper potential $E_{UP}$ and defines a lower commutator level $E_{LC}$ when the drive voltage at the input tap $40_i$ is at the lower potential $E_{LP}$.

A set of voltage level selector switches 42 sequentially couples the taps $40_{s0}$ through $40_{s6}$ to a set of phase selector switches 44 in descending order when the drive voltage at the input tap $40_i$ is at the upper potential $E_{UP}$ and in ascending order when the drive voltage at the input tap $40_i$ is at the lower potential $E_{LP}$. A set of voltage level selector switches 46 sequentially couples the taps $40_{s0}$ through $40_{s6}$ to a set of phase selector switches 48 in ascending order when the drive voltage at the input tap $40_i$ is at the upper potential $E_{UP}$ and in descending order when the drive voltage at the input tap $40_i$ is at the lower potential $E_{LP}$. The resulting inputs to the sets of phase selector switches 44 and 48 are alternating pairs of stepped ascending and descending voltages. The phase selector switches 44 and 48 each have three output lines coupled to the three-phase lines A, B and C, respectively, between the three-phase inverter 18 and the inductors 25, 26 and 27. The phase selector switches 44 and 48 selectively couple the ascending and descending voltages identified as the voltage portions UL, UR, LL and LR in FIG. 2 to respective ones of the three-phase conductors A, B and C so as to complement the power center portions UC and LC to complete the three-phase, line-to-neutral waveforms $V_{a-n}$, $V_{b-n}$ and $V_{c-n}$ illustrated in FIG. 2. The resulting line-to-line waveforms $V_{a-b}$, $V_{b-c}$ and $V_{c-a}$ are further illustrated in FIG. 2 and comprise a substantially sine-wave, three-phase, line-to-line voltage.

To provide for commutation of the controlled rectifiers 21, 22, 23, 28, 30 and 32 in the three-phase inverter 18 when the power center inverter of FIG. 1 is operating under normal conditions, the commutating tap $40_c$ is momentarily coupled to the respective three-phase line A, B or C through a capacitor 50 so as to generate the respective commutating pulses $S_{UC}$ and $S_{LC}$ of FIG. 2 to reverse bias and commutate the respective controlled rectifier 21, 22, 23, 28, 30 or 32. This is accomplished by means of a controlled rectifier 52 having its anode coupled to the capacitor 50 through a diode 53 poled to conduct current in the same direction and its cathode coupled to the phase selector switches 44 and a controlled rectifier 54 having its cathode coupled to the capacitor 50 through a diode 55 poled to conduct current in the same direction and its anode coupled to the phase selector switches 48. By gating the controlled rectifier 52 conductive when the drive voltage at the input tap $40_i$ is at the upper potential $E_{UP}$ and by coupling its cathode to the respective output line A, B or C by the phase selector switches 44, the controlled rectifier 21, 22 or 23 supplying the power center portion UC is commutated thereby. In the same manner, by gating the controlled rectifier 54 conductive when the drive voltage at the input tap $40_i$ is at the lower potential $E_{LP}$ and coupling its anode to the respective output line A, B or C by the phase selector switches 48, the controlled rectifier 28, 30 or 32 supplying the lower power center portion LC is commutated thereby. The controlled rectifiers 52 and 54 are commutated by current starvation when the capacitor 50 becomes charged positive or negative, respectively.

A three-phase, full-wave bridge rectifier 57 has its inputs coupled to the load side of the inductors 25, 26 and 27 and its positive and negative outputs coupled to the positive and negative outputs, respectively, of the full-wave bridge rectifier 12. This provides for a reactive current path which, in conjunction with a reactive current path in the single-phase inverter 20, allows the supply comprised of the alternator 10 and the full-wave bridge rectifier 12 to operate into a load 24 which exhibits down to approximately 0.0 leading or lagging power factor.

The power inverter described is substantially the same as the inverter described in my U.S. Pat. No. 3,725,767 to which reference may be made for specific details of the system described.

If a short circuit should occur line-to-line or line-to-neutral in the load 24, the output voltage from across the full-wave bridge rectifier 12 collapses and the output of the single-phase inverter 20 decreases to a level such that a potential is not available at the commutating tap $40_c$ for commutating the controlled rectifiers 21, 22, 23, 28, 30 and 32. In order to provide for commutation of these controlled rectifiers when the power center inverter is operating into a short circuit load, the current transformer 14 is provided which is comprised of primary windings 56, 58 and 60 series coupled with the respective output lines of the alternator 10. The current transformer 14 further includes Y-connected current transformer secondary windings 62, 64 and 66 whose output is coupled across a full-wave bridge rectifier 68 comprised of diodes 70, 72, 74, 76, 78 and 80. The output of the full-wave bridge rectifier 68 is coupled across a pair of series coupled capacitors 82 and 84. The capacitor 82 is coupled in parallel with the diode 55 and the capacitor 84 is coupled in parallel with the diode 53. The junction between the capacitors 82 and 84 is coupled to the neutral point of the secondary windings of the current transformer 14 and to the capacitor 50.

A voltage is induced in the secondary windings of the current transformer 14 which is a direct function of the current sensed by the primary windings 56, 58 and 60.

When a short circuit occurs in the load, the high in-rush current from the alternator 10 results in a large voltage being generated in the secondary windings 62, 64 and 66 which is rectified by the full-wave bridge rectifier 68. The capacitors 82 and 84 are charged by this rectified output. The capacitors 82 and 84 then function as power sources which, in conjunction with the inductors 25, 26 and 27, effects commutation of the controlled rectifiers 21, 22, 23, 28, 30 and 32. For example, assuming the controlled rectifier 23 is conducting into a short circuit load 24, at the end of its conduction period the controlled rectifier 52 is gated conductive to couple the positive side of the capacitor 84 to the phase selector switches 44. At the same time, the phase selector switches 44 couple the output of the controlled rectifier 52 to the output line C. The resulting high amplitude, short duration current pulse resulting from discharge of the capacitor 84 through the controlled rectifier 52 and the phase selector switches 44 is prevented from flowing into the short circuit load 24 by the impedance of the inductor 27 presented to the short duration current pulse. Consequently, this pulse is applied to the cathode of the controlled rectifier 23 which is commutated thereby. Current through the inductor 27 then flows back to the other side of the capacitor 84 through either the full-wave bridge rectifier 57, the single-phase inverter 20, the output line 35, the input tap 40, and the capacitor 50 or through the short circuit load 24 to the autotransformer 36. For example, if the line C is shorted to the ground reference potential, the current pulse would then flow to the neutral potential at the tap $40_{s0}$ and through the autotransformer 36 and the capacitor 50. The controlled rectifier 52 is commutated when the capacitor 84 is discharged and the capacitor 50 is charged. In like manner, the capacitor 84 functions as the power supply for commutating the remaining controlled rectifiers 21 and 22 coupled to the positive output of the full-wave bridge rectifier 12 and the capacitor 82 functions as the power supply to commutate the controlled rectifiers 28, 30 and 32 coupled to the negative output of the full-wave rectifier 12.

Upon correction of the short circuit in the load 24, a commutating voltage is again presented at the commutating tap $40_c$ to commutate the controlled rectifiers in the three-phase inverter 18.

To provide for an immediate commutation capability for the controlled rectifiers 21, 22, 23, 28, 30 and 32 in the inverter 18 when the circuit breakers 16 are closed to activate the inverter and a short circuit load condition exists at the time of activation, a pair of capacitors 90 and 92 are series coupled across the output of the full-wave bridge rectifier 12 with their junction being coupled to the ground reference potential. When the circuit breakers 16 are closed, the capacitors 90 and 92 present an immediate artificial short circuit to the alternator 10 whose output current increases to an initial high level as the capacitors 90 and 92 begin to charge. During this initial artificial short circuit, no current flows to the load 24. The high output current from the alternator 10 is sensed by the primary windings 56 through 60 of the current transformer 14 to induce a voltage in the secondary windings 62 through 66. This voltage is rectified by the full-wave bridge rectifier 68 to charge the capacitors 82 and 84 and thus provide commutating power to commutate the controlled rectifiers 21, 22, 23, 28, 30 and 32. After initial charge of the capacitors 90 and 92, current then flows to the load in the normal manner and operation is as previously described.

The description of a preferred embodiment for the purpose of illustrating the invention is not to be considered as limiting or restricting the invention as many modifications can be made by the exercise of skill in the art without departing from the scope of the invention.

I claim:

1. A three-phase power center inverter having continued operation into a short circuit load comprising: means for generating an alternating signal referenced to a neutral potential; a full-wave rectifier coupled to the last mentioned means for rectifying the alternating signal and supplying a first unidirectional voltage; a first inverter connected to the rectifying means for producing by controlled rectifier action, three-phase, full-wave, flat-top voltage segments; a three-phase load; three impedance means; a set of three-phase line conductors, each interconnecting the first inverter and the load through a respective one of the three impedance means, each segment of the three-phase, full-wave, flat-top voltage segments being terminated by a commutating voltage on the respective line conductor; a second inverter connected to the rectifying means and operating in synchronism with the first inverter for producing at its output, single-phase, flat-top voltages alternating between the upper and lower potential at a rate three times the frequency of the three-phase voltage segments produced by the first inverter; an inductor having an input tap connected to the output of the second inverter, a low voltage tap connected to the neutral potential, a plurality of intermediate voltage taps between the low voltage tap and the input tap and a step-up tap in voltage multiplying position in relation to the flat-top voltage; a voltage distributor including first and second phase selectors, each having an input and means for selectively coupling said input to the line conductors in synchronism with the first inverter; means for connecting the low voltage and intermediate taps in ascending and descending order in synchronism with the first inverter to the inputs of each of the first and second phase selectors during the period said phase selectors are coupled to a respective line conductor to approximate on the line conductors, in relation to the neutral potential, a balanced and symmetrical voltage; a current sensor for sensing the current output of the means for generating an alternating signal and providing a second unidirectional voltage; first and second series coupled capacitors; means for coupling the second unidirectional voltage across the series coupled capacitors for charging said capacitors; first and second diodes each coupled in parallel with a respective one of the first and second capacitors and being poled so as to prevent discharge of the capacitor parallel coupled therewith; means for coupling the junction between the series coupled capacitors to the step-up tap; and means effective at the beginning of each of the periods the phase selectors are coupled to a line conductor for momentarily coupling a respective one of the high and low voltage sides of the series coupled capacitors to said last mentioned line conductor at a point intermediate the respective impedance means and the first inverter so as to commutate the first inverter, whereby said capacitors function to provide commutating power for commutating the first inverter in the event of a short circuit in the three-phase load.

2. A three-phase power center inverter having continued operation into a short circuit load comprising: generator means for generating an alternating signal referenced to a neutral potential; a full-wave bridge rectifier; contacter means coupled between the generator means and the full-wave bridge rectifier and operable when actuated to couple the alternating signal to the full-wave bridge rectifier, said rectifier rectifying the alternating signal and supplying a first unidirectional output signal; capacitive means coupled across the output of the full-wave rectifier, said capacitive means presenting a temporary short circuit to the generator means to cause said generator means to supply a high level current signal, a first inverter connected across the capacitive means for producing by controlled rectifier action, three-phase, full-wave, flat-top voltage segments when said capacitive means is charged; a three-phase load; three impedance means; a set of three-phase line conductors, each interconnecting the first inverter and the load through a respective one of the three impedance means, each segment of the three-phase, full-wave, flat-top voltage segments being terminated by a commutating voltage on the respective line conductor; a second inverter coupled across the capacitive means and operating in synchronism with the first inverter when said capacitive means is charged for producing at its output, single-phase, flat-top voltages alternating between the upper and lower potential at a rate three times the frequency of the three-phase voltage segments produced by the first inverter; an inductor having an input tap connected to the output of the second inverter; a low voltage tap connected to the neutral potential, a plurality of intermediate voltage taps between the low voltage tap and the input tap and a step-up tap in voltage multiplying position in relation to the flat-top voltage; a voltage distributor including first and second phase selectors, each having an input and means for selectively coupling said input to the line conductors in synchronism with the first inverter; means for connecting the low voltage and intermediate taps in ascending and descending order in synchronism with the first inverter to the inputs of each of the first and second phase selectors during the period said phase selectors are coupled to a respective line conductor to approximate on the line conductors, in relation to the neutral potential, a balanced and symmetrical voltage; a current sensor for sensing the current output of the means for generating an alternating signal and providing a second unidirectional voltage; first and second series coupled capacitors; means for coupling the second unidirectional voltage across the series coupled capacitors for charging said capacitors; first and second diodes each coupled in parallel with a respective one of the first and second capacitors and being poled so as to prevent discharge of the capacitor parallel coupled therewith; means for coupling the junction between the series coupled capacitors to the step-up tap; and means effective at the beginning of each of the periods the phase selectors are coupled to a line conductor for momentarily coupling a respective one of the high and low voltage sides of the series coupled capacitors to said last mentioned line conductor at a point intermediate the respective impedance means and the first inverter so as to commutate the first inverter, whereby said capacitors function to provide commutating power for commutating the first inverter in the event of a short circuit in the three-phase load.

* * * * *